219-121. 7-31-73 XR 3,750,049 SR

United States Patent [19]

Dowley et al.

[11] 3,750,049

[45] July 31, 1973

[54] LASER TRIMMING TOOL

[76] Inventors: Mark W. Dowley, 333 Byron St.; Wayne S. Mefferd, 2479 Chabot Ter., both of Palo Alto; Robert J. Rorden, 24401 Summerhill Ave., Los Altos, all of Calif.

[22] Filed: Sept. 30, 1970

[21] Appl. No.: 76,684

[52] U.S. Cl. ......... 331/94.5, 219/121 LM, 350/275, 250/236

[51] Int. Cl. ........ H01s 3/11

[58] Field of Search ........ 331/94.5; 219/121 L, 219/121 LM; 350/275; 250/236

[56] References Cited

UNITED STATES PATENTS

| | | | |
|---|---|---|---|
| 3,281,712 | 10/1966 | Koester | 331/94.5 |
| 3,286,193 | 11/1966 | Kobster et al. | 331/94.5 |

OTHER PUBLICATIONS

Penrod, J., Laser Focus, Vol. 4, No. 15, Aug. 1968, pp. 25–26.

Basov et al., Soviet Physics JETP, Vol. 16, Jan. 1963, pp. 254–255.

*Primary Examiner*—Ronald L. Wibert
*Assistant Examiner*—R. J. Webster
*Attorney*—Limbach, Limbach & Sutton

[57] ABSTRACT

A laser trimming tool includes a laser, means for directing the output beam from the laser onto the workpiece being trimmed, and a gas jet directed obliquely at the workpiece in the region of the intersection with the laser beam during the trimming operation. An improved Q-switch, forming an integral part of the laser cavity, is used to provide a pulsed beam output. To insure that the proper amount of the workpiece is trimmed, a fast response resistance level detector is used.

2 Claims, 14 Drawing Figures

INVENTORS
MARK W. DOWLEY
WAYNE S. MEFFERD
ROBERT J. RORDEN

INVENTORS
MARK W. DOWLEY
WAYNE S. MEFFERD
ROBERT J. RORDEN

INVENTORS
MARK W. DOWLEY
WAYNE S. MEFFERD
ROBERT J. RORDEN

INVENTORS
MARK W. DOWLEY
WAYNE S. MEFFERD
ROBERT J. RORDEN

LASER TRIMMING TOOL

BACKGROUND OF THE INVENTION

The present invention relates to an improved laser trimming tool and, more particularly to a laser tool for use in resistor and capacitor trimming.

Resistor trimming is used in thick and thin film hybrid circuit manufacturing. An initial section of resistance material, having a resistance value lower than desired, is first formed. The resistance trimmer then removes material from the resistor in order to increase the resistance to the desired value. In typical prior art resistor trimmers, this has been done by an abrasive jet of sand. However laser trimmers are becomming accepted because they are clean and the speed of trimming is much greater.

Laser resistor trimming uses a high power density, optical beam to evaporate some of the resistor material to increase the current path length and thereby producing a consequent increase in the resistance value. A laser trimming tool should have the following properties.

1. The beam should have a fine focus point or spot size in order to trim very small resistors. Spot size of 0.001 to 0.004 inch can make resistors as small as 0.020 × 0.020 inch.

2. The tool should efficienty remove the resistor material. To achieve this the optical power should be delivered at very high peak power in order to cause instantaneous vaporization of the material rather than produce melting or mere heating which can result at low beam powers.

3. The laser tool should be moved over the workpiece in a controlled manner in order to smoothly and uniformly remove the resistor material. Typically a straight cut into the resistor material is made. Alternatively an L-cut can be made if very high precision is required. The cut parallel to the current flow changes the resistance value less quickly and allows for finer control of the end value. Typical speeds for conventional sand abrasive trimmers is 0.1 to 0.2 inch/sec. Accurate laser trimming can be achieved at 1–4 inch/sec.

4. The ability to rapidly detect the attainment of the required resistance value and to subsequently rapidly turn off the laser is also essential in achieving maximum efficiency from the laser trimming tool. For example if the laser is Q-switched to provide pulses at 10 KHz, the value of the resistor is changing in increments once every 100 microseconds.

Actually, the effect of a laser pulse is such that the measured resistance first decreases immediately after the pulse and later, 10–50 microseconds, increases to its new value. The initial decrease is due to local electrical shorting by the ionized vaporized plasma.

Thus one must be able to rapidly follow this resistance change to give a true reading of resistance shortly before the next pulse arrives. Otherwise only the mean value of the resistance between pulses will be monitored. Consequently, the resistance measuring equipment should have a response time of about 20 microseconds or better.

The ability to turn the laser off immediately on attainment of the required resistance value can be appreciated from the realization that if more (one or a few) pulses are delivered to the workpiece after the desired resistance value has been attained then the resistance will be increased beyond the desired value and the substrate most likely will have to be discarded.

SUMMARY OF THE INVENTION

In accordance with the present invention, an improved laser trimming tool includes an improved Q-switch for use with a $CO_2$ laser. The Q-switch, along with a short focal length lens, is used to provide high power density pulses typically in the vicinity of $10^7$ watts/cm$^2$. The improved Q-switch comprises the use of a short radius reflector in combination with a single positive lens axially aligned therewith. At the point between the reflector and the lens where the laser beam is focused, a shutter assembly, such as a mechanical chopper wheel is placed.

A gas jet is applied obliquely to the workpiece at the point where the laser beam intersects and interacts with the workpiece surface. The gas used may be air, nitrogen, oxygen, or other suitable gas, and, depending upon which particular gas is used, has the effect of increasing the optical efficiency of the system by removing dirt and debris, protecting the object or focusing lens, and aiding in the actual trimming process.

In accordance with another aspect of the present invention, improved resistance level detector apparatus is provided. It includes a resistance bridge circuit with the workpiece resistance forming one resistance leg of the bridge. A low impedance bridge detector is connected between the branches which effectively shorts the bridge terminals. The time constant of the bridge is thus made small despite the existance of stray capacitance resulting from the resistance level detector being remotely located from the workpiece resistor.

The detector includes a high-gain, directly coupled amplifier, such as an operation amplifier. A feedback network, desirably of non-linear circuit elements such as back-to-back diodes, is connected across the amplifier. When the workpiece resistance is trimmed to the proper value, the direction of flow of current through the amplifier reverses. This change is sensed and appropriate control action is taken.

DESCRIPTION OF THE PREFERRED EMBODIMENTS

As described above, laser trimming consists of using a high power density optical beam to evaporate that part of a workpiece which is to be trimmed. A common application is in resistor and capacitor trimming in thick and thin film hybrid circuit processing.

Figure 1A:
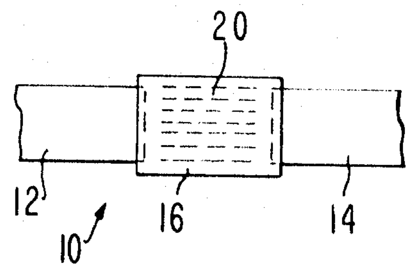
FIGS. 1A through 1C are plan views of a thick film resistor illustrating the method by which such a resistor is trimmed to the desired resistor value.

Referring to FIG. 1A, a workpiece 10 to be trimmed comprises conductor film leads 12 and 14. A suitable resistor material 16 is evaporated or screen printed or otherwise disposed between the conductor film leads 12 and 14. The value of the resistance material 16 in FIG. 1A is lower than the required or desired ultimate resistance.

Figure 1B:
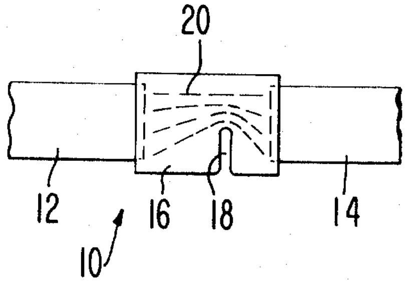

FIG. 1B illustrates the resistor after a trim operation. A transverse cut 18 is made into the resistance material 16. The cut 18 increases the resistance of the resistor material 16 by increasing the length of the current path 20 as shown. It is very important, as discussed above, to make the size of the cut 18 no larger than required to provide the desired resistance.

Figure 1C:
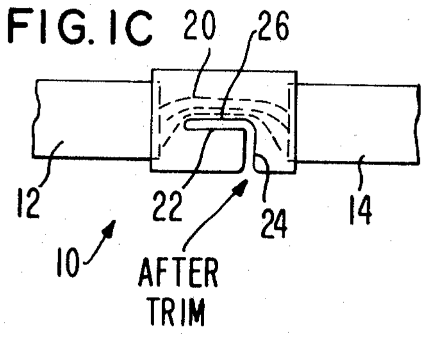

FIG. 1C illustrates a way of trimming where precision resistance values are required. Here, an L-shaped cut 22 is made, which includes a transverse cut 24 and a parallel cut 26 which is roughly parallel with the direction of the current path. The parallel cut tends to affect the current path less than transverse cut 24. Consequently, the value of the resistance 16 can be more accurately regulated.

A laser trimming tool includes a laser, means for mounting and holding the workpiece being trimmed and suitable means for moving the laser beam with respect to the workpiece. Either a $CO_2$ laser, such as the Coherent Radiation Model 42 or 41 laser, or a YAG laser such as the Coherent Radiation Model No. 60 YAG laser, are particularly well adapted for this task.

There are two usual ways of providing relative movement between the laser beam and the workpiece so as to be able to cover the entire area needed to be trimmed, and, where necessary, to be able to cut in either the X or Y direction as required for the L-shaped cut of FIG. 1C. In the first type, the laser beam is held fixed and the workpiece is mounted on a numerically controlled, movable X-Y table. In the second type the laser beam is moved with respect to a stationarily mounted workpiece. The laser, or the output beam from the laser, is moved or transported across the stationarily mounted workpiece. For example, a stationarily mounted laser can be used with a Model 1300 movable X-Y optical system made by Electroglass, Inc. of Menlo Park, California, to move the output beam over the workpiece.

Figure 2:
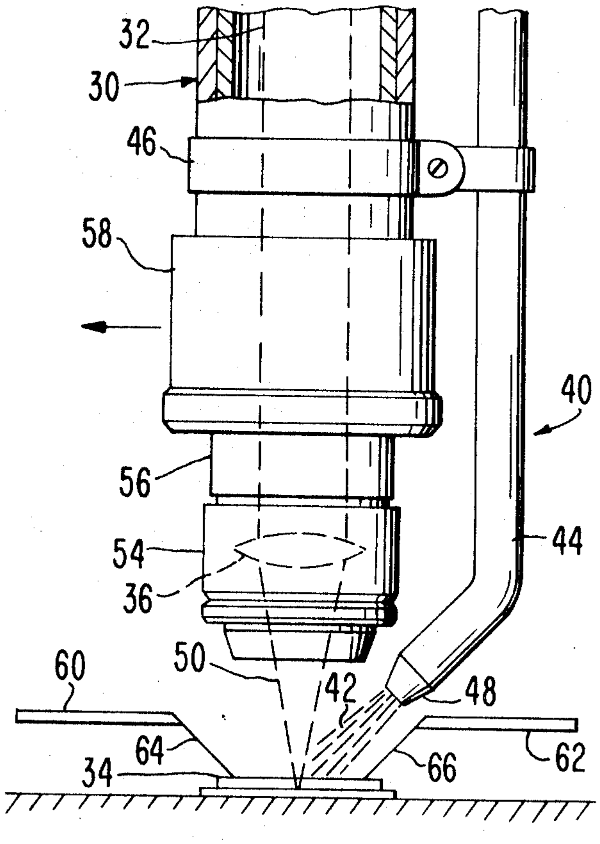
FIG. 2 is an elevational view, partially in section, of the laser trimming head, including the gas jet assembly.

Since the construction of such a laser trimming system is well known to those skilled in the art, the overall laser trimming system has not been shown or described in this patent application. FIG. 2 shows the details of the laser trimming head made in accordance with the present invention. The laser beam 32 is brought to a focus on the work surface or workpiece 34 by means of a short focal length lens 36. The lens 36, in one embodiment, has a focal length of 1.5 inches.

The lens 36 must be protected from the evaporated debris which is generated during the trimming process as described above. The debris tends to be ejected upwards toward the lens. In accordance with the invention, a gas jet assembly 40 provides a gas jet 42 during the cutting or trimming operation. A suitable source of gas is provided through the gas jet tube 44 which is mounted by suitable means, such as clamp ring 46, to the trimming head assembly 30.

The nozzle portion 48 of the gas jet is positioned so that the gas jet 42 strikes the workpiece 34 obliquely thereto, and in the region where the focused laser beam 50 interacts with the workpiece surface 34. It has been found that a preferred angle for the gas jet 42 to strike the workpiece 34 is from 30° to 60°, and desirably about 45°.

The gas jet 42 has been found to significantly assist the trimming operation in some cases. Certain resistor materials are difficult to evaporate. When this occurs, the rate of laser trimming is reduced. By use of a jet of oxygen or air on the work surface, the rate of evaporation, and hence the trim rate, is increased, while at the same time the lens is protected. When no additional cutting aid is needed, an inert gas such as nitrogen is suitable for use as the gas jet.

When oxygen is used to assist in the trimming it has been found desirable for the jet assembly 40 to be positioned behind the laser beam 50 with respect to the relative movement of the workpiece and the trimming head. Thus in FIG. 2 the direction of movement of the trimming head 30, and hence the laser beam 50, is indicated by the arrow. The jet assembly 40 trails the laser beam 50. The gas jet 42 thus is directed toward the oncoming workpiece hence in a direction toward which the cut is progressing. This arrangement provides for more efficient trimming than otherwise possible.

The lens 36 is mounted within a lens assembly 54 which is attached within an internal sleeve 56. A focusing assembly 58 is used to raise and lower the lens 36 to properly focus the laser beam 50 onto the workpiece. A pair of electrical probes 60 and 62, having needle-like contact points 64 and 66 respectively, contact the resistance material forming the workpiece 34. These probes are connected to the resistance level detector which will be described subsequently with respect to FIG. 8.

Figure 3:
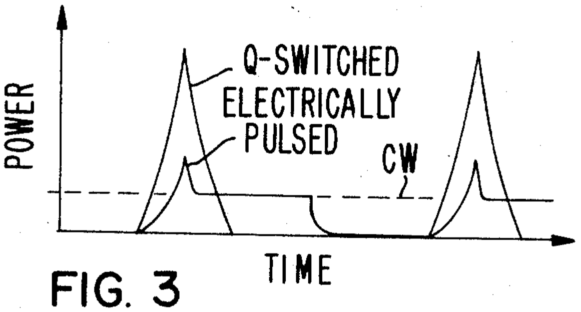
FIG. 3 is a graph illustrating the output from a laser operated in several different modes of operation.

Q-switching should be distinguished from other means for providing a pulsed output from a laser. For example, a laser may be electrically pulsed, and, if the pulse is of sufficiently short duration, the resulting output will be approximately twice the continuous wave power. This may be seen more clearly by reference to FIG. 3. It is also possible to pulse the output by providing an external chopper.

Q-switching on the otherhand, is a way of pulsing the laser output from within the resonator cavity. Q-switching, or Q-modulation or Q-spoiling, is the process of suddenly increasing the quality factor (Q) of a resonant laser cavity from below the threshold for lasing to above it. If the spontaneous lifetimes of the laser levels, dominated by the collisional lifetime in the case of a $CO_2$ laser, are longer than the stimulated radiative lifetimes, then energy stored up in the non-lasing condition will be released after the Q-switch is switched on. This causes a pulse of laser light to appear, which subsequently decays to the continuous (CW) power value, which may be zero. See FIG. 3. It should be noted that regardless of the type of Q-switching arrangement used, the peak power achieveable is generally in the vicinity of 1 kilowatt.

Figure 4A:
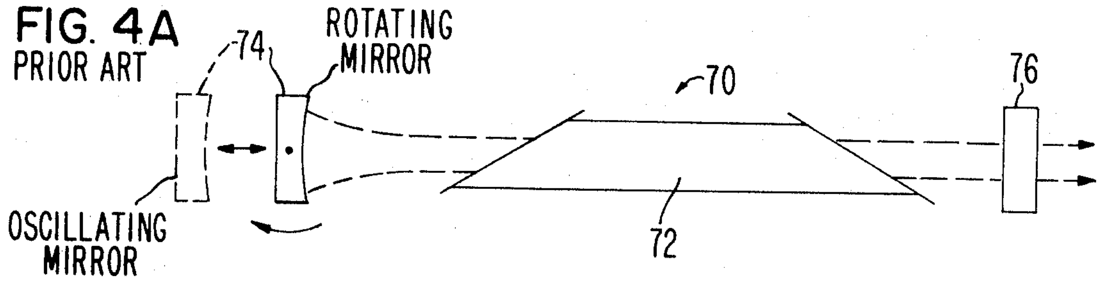
FIG. 4A PRIOR ART
FIGS. 4A through 4C are schematical representations of prior art Q-switches.
Figure 4B:
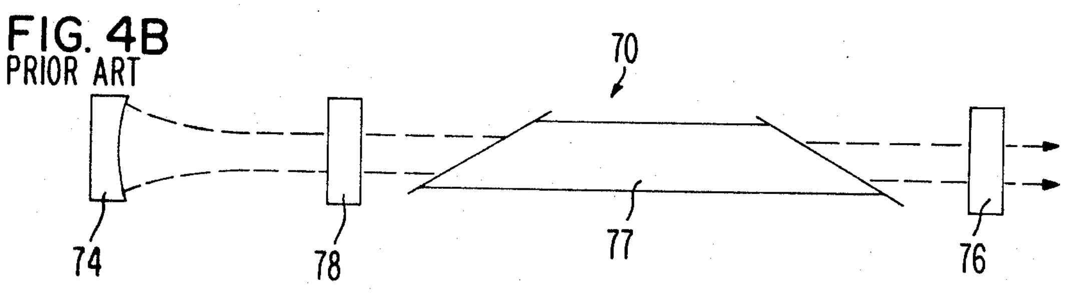
FIG. 4B PRIOR ART
Figure 4C:
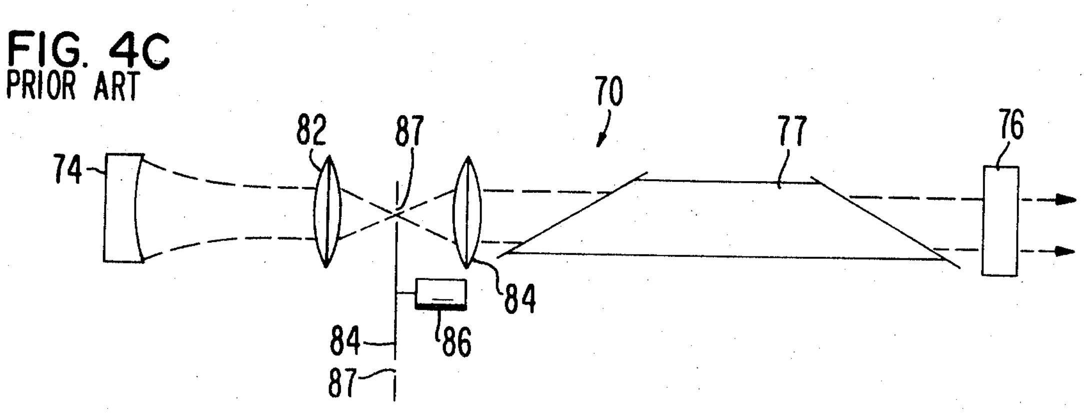
FIG. 4C PRIOR ART

Several prior art Q-switches are shown in FIGS. 4A–4C. Laser cavity 70 of a laser, such as a $CO_2$ laser, includes a gas confining, excitation tube 72. The gas within the tube 72 is pumped or excited in a manner well known to those in the laser art. The cavity 70 includes a pair of reflectors 74 and 76. Reflector 76 is partially transmitive whereas reflector 74 reflects substantially 100 percent of the resulting laser light.

In the Q-switch arrangement of FIG. 4A the rear reflector 74 shown by the solid lines is rotated in and out of resonance. The maximum rate at which the reflector 74 may be rotated is approximately 400 revolutions per second. Thus the pulsing rate is limited to this speed. Also shown in FIG. 4A is a second Q-switching method. The reflector 74 is oscillated between the position shown in solid lines and the position shown in dotted lines and hence in and out of reasonance with a specific laser transition. This is sometimes referred to as reactive Q-switching. This approach also has inherent speed limitations.

FIG. 4B illustrates a laser having an optical modulator 78 for Q-switching. Optical modulators are frequently used with YAG-lasers. However they are not presently suitable for operation with $CO_2$ lasers because of their low efficiency.

FIG. 4C illustrates a Q-switch first developed by Dietrich Meyerhofer of RCA. A pair of lenses 82 and 84, arranged as shown, causes the beam to constrict. A shutter assembly, such as a mechanical chopper wheel 84, is rotated by a motor 86. The chopper wheel 84 comprises a circular disk having a plurality of slots or holes 87 located around the outer circumference of the wheel. The chopper wheel is aligned so that the holes 87 in the chopper wheel pass through this constriction. When a hole is aligned with the beam, a laser pulse is emitted. When no hole is aligned with the beam, the beam is blocked by the disk and optical resonance is destroyed.

The arrangement of FIG. 4C is more advantageous than the Q-switches of FIG. 4A, since the motor 86 does not have to be rotated nearly as fast to achieve the same pulsing rate as the motor for the two embodiments of FIG. 4A. The only limitation upon this system is that enough excitation (pumping) time must be permitted between each pulse to provide maximum laser power.

Figure 5:
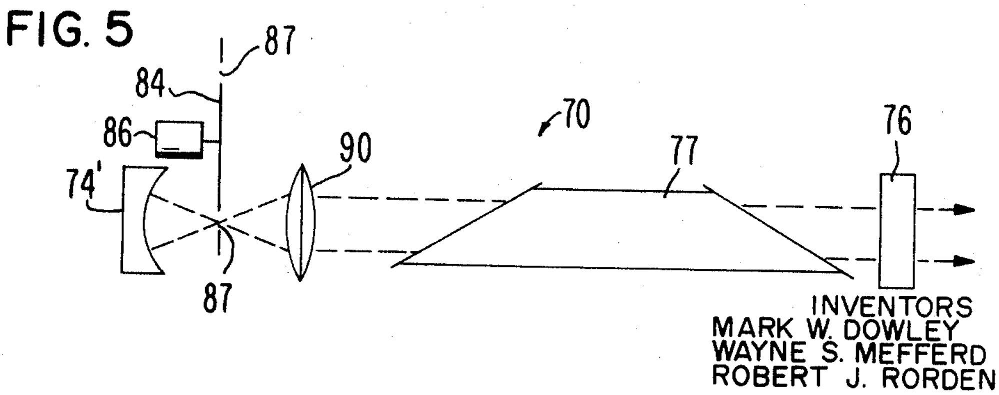
FIG. 5 is a schematical representation of an improved Q-switch made in accordance with the present invention.

Referring to FIG. 5, the improved Q-switch of the present invention utilizes only a single, positive lens 90 within the optical cavity 70. The rear reflector 74' has a short focal length thereby eliminating the need for a second lens within the cavity 70. A motor 86 and a chopper wheel 84, having a plurality of holes 87, is positioned with the holes rotating through the point of restriction of the laser beam.

The elimination of a lens wlthin the optical cavity has two important advantages. First, it cuts down optical power losses within the resonator cavity and secondly, it makes it easier to align the reflector 74' and the lens 90 so as to achieve a good optical mode.

Note that the combination of lens 90 and short radius reflector 74', when properly adjusted, is equivalent to a single long radius reflector. This equivalent radius results in a $TEM_{00}$ mode of operation.

Figure 6:
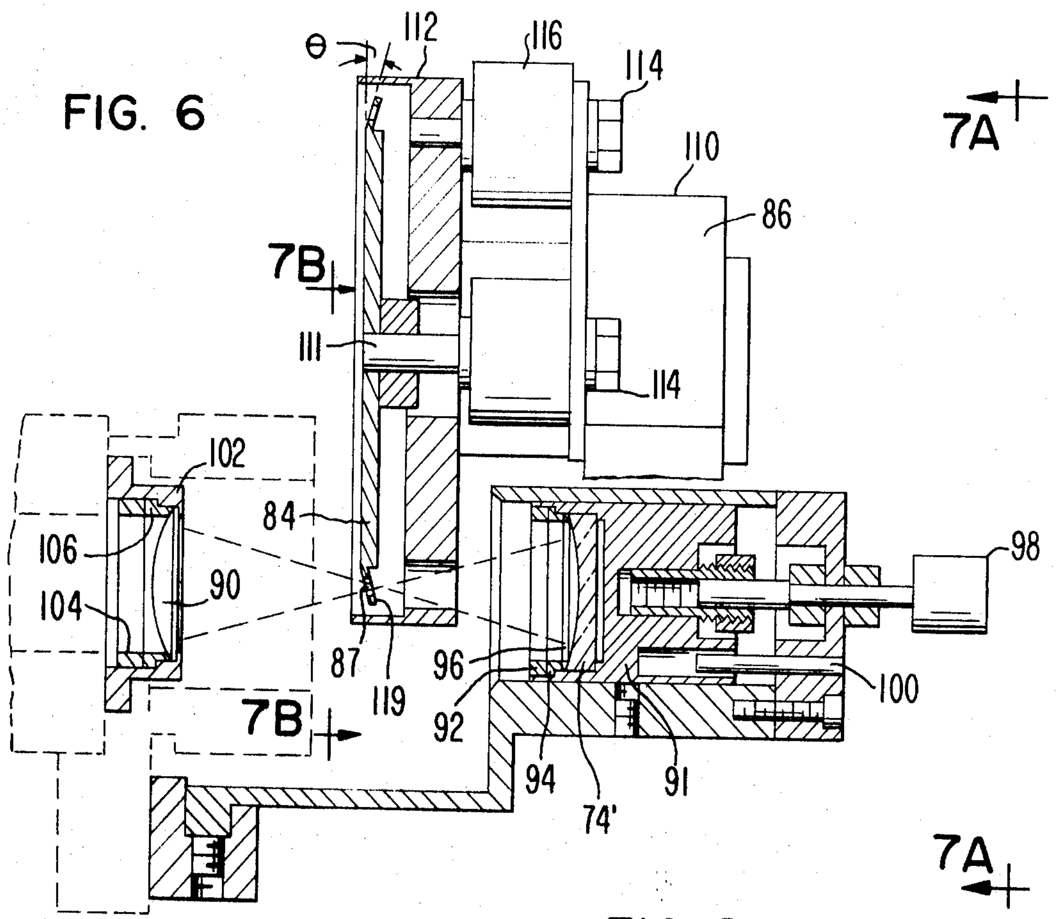
FIG. 6 is a detailed illustration of one embodiment of the improved Q-switch of FIG. 5, shown in an elevational view, partially in section.
Figures 7A, 7B:
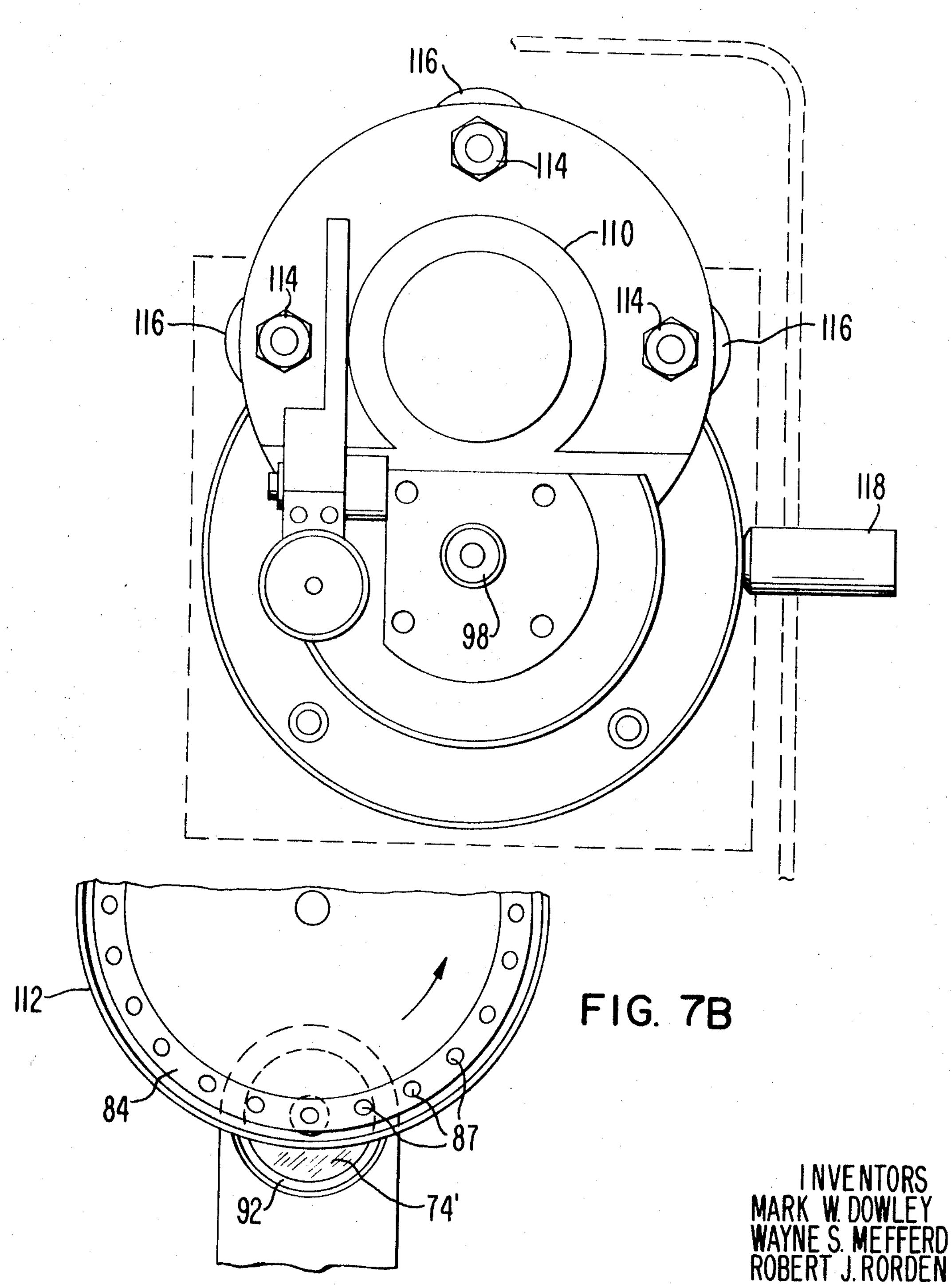
FIG. 7A is a back view of the laser Q-switch of FIG. 6 taken along a direction indicated by the arrow.
FIG. 7B is a front view of a portion of the Q-switch of FIG. 6 taken along a direction indicated by the arrow.

One embodiment of the improved Q-switch of FIG. 5, is shown in FIGS. 6, 7A and 7B. The reflector 74' is held within an adjustable lens housing 91 by means of a lens retainer 72, thrust ring 94, and wire ring 96. The alignment of the reflector 74' is effected by means of a reflector adjustment 98. Pin 100 prevents rotation of the lens assembly during adjustment. The single positive lens 90 is also held within a mounting assembly 102 which includes a lens retainer 104 and a thrust ring 106.

The motor 86 is enclosed in a motor housing 110 which supports a chopper housing 112 which encloses the chopper wheel 84. The chopper housing 112 is secured to the motor housing 110 by suitable mounting means such as bolts 114 and spacers 116. The chopper wheel 84 is attached to the motor 86 by the motor shaft 111. Alignment of the lens 90 is effected by suitable adjustment means 118.

The outer periphery 119 of the chopper wheel 84 in which the plurality of holes 87 are made, is tilted at an angle $\theta$ from the remainder of the chopper wheel 84. The laser beam, before being extinguished when a hole 87 moves out of alignment with the beam, can cause damage to the chopper wheel. By tilting the periphery 119, any residual laser beam is deflected harmlessly downward. Desirably $\theta$ is from 30° to 60°.

It should be understood that the present invention is equally applicable to a Q-switch utilizing the front reflector 76 in place of the back reflector 74' and by positioning the positive mirror 90 at the front of the laser optical cavity 70.

In the embodiment illustrated in FIGS. 6, 7A and 7B, the lens 90 has a 1.5 inch focal length and is a high quality, low loss lens with less than 1.5 percent absorption. The reflector 74' has a 1.5 inch radius of curvature. Using a Model 41, 250-watt Coherent Radiation $CO_2$ laser, the average Q-switched power is 60 watts with a peak power of 12 kilowatts. Using a Model 42, 50-watt Coherent Radiation $CO_2$ laser, the average Q-switched power is 6 watts with a 2 kilowatt peak power. Both have a pulse duration of 0.4 microseconds.

The pulse rate is dependent on the number of holes or slots 87 in the segmented wheel 84 and the rate of revolution of the wheel 84. In one embodiment, 25 holes or slots 87 are provided in the wheel 84 and the wheel is rotated at 400 revolutions per second, giving a pulse rate of 10,000 pulses per second. For resistor trimming thick-film resistors (cermet type), average power of 1 to 5 watts is required to achieve trimming at high speeds of 1 to 4 inches per second. The above figures clearly show that these speeds are achievable with the present improved Q-switch.

When the laser tool of the present invention is being used to trim resistors, a resistance measuring device is required in order to turn off the laser when the correct value of the resistance is reached. The usual resistance measuring device is a Wheatstone or Kelvin bridge coupled with a voltage responsive amplifier.

The resistance value is affected by the heat caused by the laser beam and by the conductivity of the hot material vaporized from the resistor. To minimize this problem, the laser is operated in a Q-switched mode as previously described. The resistance bridge must be capable of responding in a small fraction of the pulse period in order to accurately turn off the laser when the resistance is at the proper value.

Typically, the resistor being trimmed is remotely located from the resistance measuring equipment. Consequently, stray capacitance of the lead lines reduces the response time of the system and the resistor trimming accuracy of the system is lowered.

Figure 8:
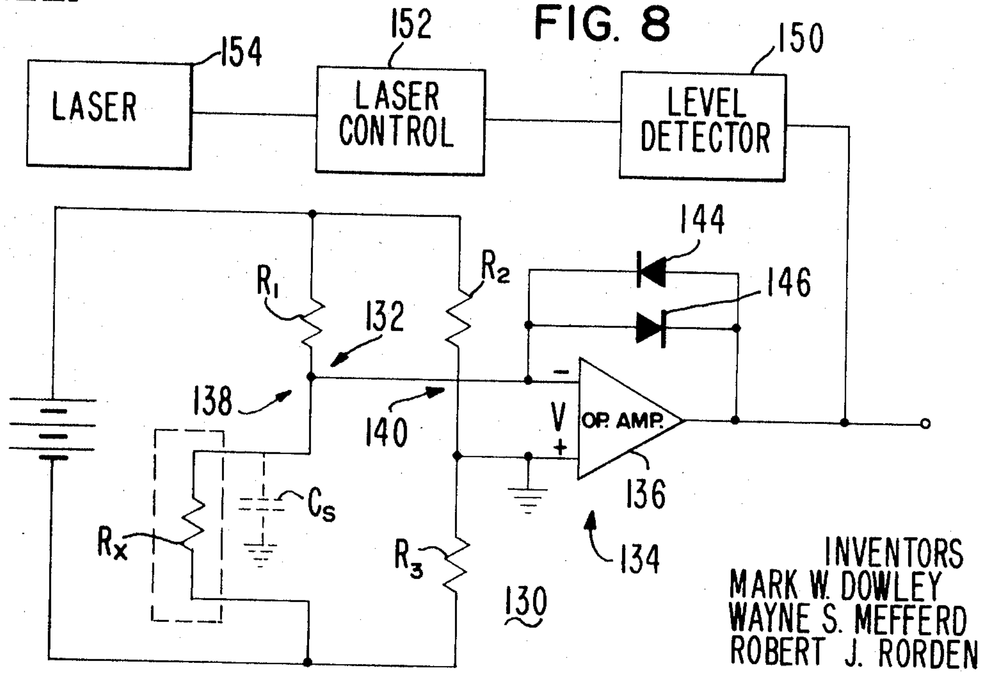
FIG. 8 is a schematic illustration of the improved resistance level detector in accordance with the present invention.

The improved resistance level detector 130 shown in FIG. 8 effectively neutralizes the parasitic affects of the stray capacitance $C_s$. The resistance level detector circuit 130 includes a resistance bridge circuit 132 and a bridge detector circuit 134. The later comprises an operational amplifier 136 connected between the branches 138 and 140 of the bridge circuit 132. A feedback network 142 comprising, in the preferred embodiment, a non-linear network such as a pair of back-to-back diodes 144 and 146, is connected across the operation amplifier 136. One branch 140 of the bridge circuit 132 includes 2 resistance legs R2 and R3. The other branch 138 comprises the resistance Rx being trimmed and a range resistor R1, forming the other leg or branch 138.

Figure 9:
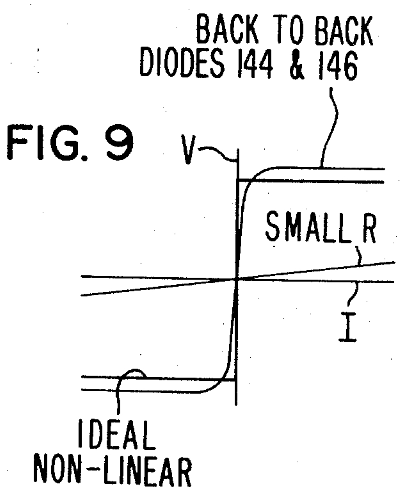
FIG. 9 is a graphical illustration of the V/I relationships with various elements used in the feedback network in FIG. 8.

The effect of the feedback arrangement is to keep the voltage V across the input terminals of the amplifier 136 at zero volts, regardless of the relative values of R1 and RX. The unbalanced current output of the bridge initially flows through diode 144, when RX has a higher resistance than desired, as is the case at the beginning of every trimming operation. When the resistance RX is at the correct value, i.e., when R1/RX = R2/R3, the direction of the current fed back across the operational amplifier 136 reverses. That is, the current is conducted in the opposite direction through diode 146. Diodes are used to feed back the current since the non-linear operational characteristics of back-to-back diodes result in a very rapid change of current near the zero voltage level. This is illustrated in FIG. 9. Note the close approximation to the ideal non-linear network which is achieved by the back-to-back diodes 144 and 146.

When the resistance bridge 132 crosses the balance point, the bridge detector 134 current reverses. While the voltage V across the amplifier 136 inputs remains near 0, the output goes from approximately +½ volt to −½ volts. This change is detected by a level detector circuit 150, which amplifies the signal and then transmits it to a laser control system 152 to shut down the laser 154. The laser control system 154 cuts the tube current off in the laser 154 to zero in the case of a $CO_2$ laser. For a YAG laser having an accoustic Q-switch, the laser is left in the low Q-mode and no oscillation (lasing) occurs. Because the resistance level detector of the present invention is current responsive rather than voltage responsive, the voltage lag caused by the stray capacitance $C_s$ is of no importance.

The values of resistors R2 and R3 are made substantially less than the values of resistor R1 and the resistor being trimmed RX. In one embodiment R2 is one K-ohm, and R3 is from 1 to 10 K-ohm, determined by the desired value of RX. In the embodiment shown, the diodes 144 and 146 are 1N914 types and the operational amplifier 136 is a Fairchild ADO-26. Resistor R1 is adjusted so as to approximate the value of the desired resistance for RX.

The feedback network 142, while comprising a non-linear network in the preferred embodiment, can comprise a small feedback resistance in place thereof. The voltage-current characteristic of such a resistor in feedback across the operational amplifier 136 is illustrated in FIG. 9. While the response time with a resistance as the feedback element is correspondingly lower, the resistance level detector 130 provides additional information regarding the amount of deviation of the resistor RX from the desired resistance. That is, with the non-linear feedback arrangement it is only possible to detect if the resistance is, or is not, the correct value. With a small resistor feedback plus the operational amplifier, it is possible to determine how much the resistor is from the desired value.

The usual $CO_2$ laser, including the two Coherent Radiation lasers described above, actually consists of a mixture of three gases: $N_2$, He and $CO_2$. For example, in the Coherent Radiation Model 42 laser, the percentage, by volume, of these gases is 82 percent, 13.5 percent, and 4.5 percent. The addition of the He and $N_2$ increases the output power of the laser.

Cutting the tube current to zero for a $CO_2$ laser having this mixture of gases does not produce the ideal situation in that a few after-pulses occur. These after-pulses may give rise to reduced accuracy particularly where high accuracy is required. The after-pulses act to vaporize additional resistance material and hence it is difficult to precisely trim the correct amount of material. These after-pulses occur because of excitations stored in the $N_2$ molecules of the gas mix. This excitation is relatively long-lived and only slowly transferred to the $CO_2$ molecules which in turn get rid of the energy by lasing whenever the cavity Q is raised.

These after-pulses may be eliminated by removing the $N_2$ gas from the laser mix. Lower average power results (30 percent) but greater accuracy can be achieved. Upon removing the $N_2$ from the gas mix only one after-pulse occurs and this can be allowed for. With a YAG laser having an accoustic Q-switch no after-pulses occur.

In one embodiment, after the $N_2$ was removed, the remaining gas mixture comprises, by volume, 92 percent He and 8 percent $CO_2$ at a total pressure of 14.6 torr.

The aforedescribed arrangement provides very rapid response times, and provides a very quick indication when the proper value of the resistor has been reached.

While one specific embodiment of the invention has been illustrated and described in detail herein, it is obvious that many modifications thereof may be made without departing from the spirit of the invention as described in the appended claims.

We claim:

1. A Q-switch within the optical resonator cavity of a laser comprising:

a. an optical assembly for focusing the laser beam and then re-collimating the same within the optical resonator cavity comprising
   i. a reflector mirror forming a part of said optical resonator cavity, said mirror having a radius of curvature for focusing the laser beam within the resonator cavity, and
   ii. a single lens axially disposed adjacent to said reflector mirror within said resonator cavity, b. shutter means for periodically interrupting the laser beam at the focusing point between said single lens and said reflector mirror for Q-switching the laser output, c. said shutter means comprising a light-reflective motor-driven rotary chopper wheel located in a plane normal to the laser beam, said chopper wheel including a circumferentially extending peripheral portion through which are provided a plurality of spaced apart slots distributed around said peripheral portion, said peripheral portion forming an angle $\theta$ with the remaining part of said chopper wheel for deflecting the laser beam impinging thereon out of the resonator cavity, and wherein said chopper wheel is positioned so that the said slots go in and out of alignment with said laser beam.

2. A Q-switch within the optical resonator cavity of a laser comprising:

a. an optical assembly for focusing the laser beam and then re-collimating the same within the optical resonator cavity comprising i. a reflector mirror forming a part of said optical resonator cavity, said mirror having a radius of curvature for focusing the laser beam within the resonator cavity, and ii. a single lens axially disposed adjacent to said reflector mirror within said resonator cavity, b. shutter means for periodically interrupting the laser beam at the focusing point between said single lens and said reflector mirror for Q-switching the laser output, c. said shutter means comprising a light-reflective motor-driven rotary chopper wheel, said chooper wheel having a plurality of slots located around the periphery thereof, said chopper wheel being positioned so that said slots go in and out of alignment with said laser beam, and wherein said plurality of slots are located on a surface inclined from a plane normal to the direction of the laser beam for deflecting the laser beam impinging thereon out of the resonator cavity.

* * * * *